May 29, 1962     K. H. FOLSE     3,036,497
PHOTOGRAPHIC DODGING APPARATUS
Filed Oct. 19, 1959
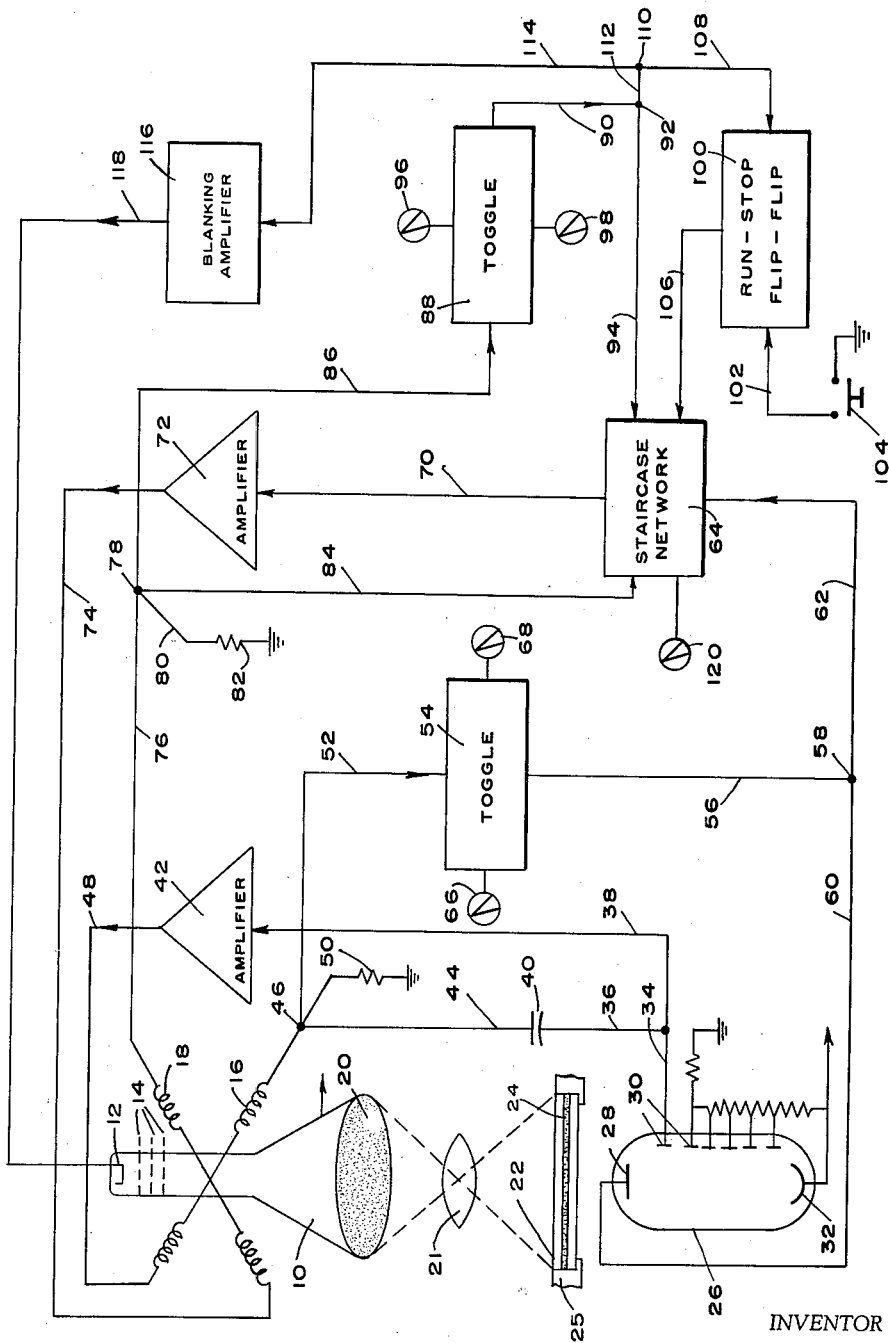
INVENTOR
KENNETH H. FOLSE
BY
ATTORNEY

United States Patent Office 3,036,497
Patented May 29, 1962

3,036,497
PHOTOGRAPHIC DODGING APPARATUS
Kenneth H. Folse, Oxon Hill, Md., assignor to Logetronics, Inc., Alexandria, Va., a corporation of Delaware
Filed Oct. 19, 1959, Ser. No. 847,384
7 Claims. (Cl. 88—24)

This invention relates to photographic dodging apparatus wherein a beam of light scans a subject from which a portion of the light is directed to a photosensitive surface to produce a print, the scanning velocity of the beam being controlled as a function of the intensity of a portion of the light directed from the subject to the photosensing surface.

Prior methods and apparatus directed to automatic dodging have related to the control of the intensity of the light beam, its spot size and/or its dwell time as will be exemplified by the disclosures of the patent to Craig No. 2,842,025, dated July 8, 1958, and the pending application in the name of Folse, Serial No. 666,126, filed June 17, 1957, now U.S. Patent 3,011,395, issued December 5, 1961.

Where the intensity of the light beam is modified it is impossible to utilize the full amount of light available from the source at all times, the effective color of the light changes with its intensity, and the requirement of a closed loop type of circuit presents undesirable problems of oscillation. Where intensity or spot size is controlled, a change in the size of a raster necessitates compensation of the exposure control function or the provision of additional sensing equipment. The use of a variable dwell time is relatively slow as compared with the apparatus contemplated by the present invention and requires additional circuits to provide for separation of the exposure control and deflection functions.

By the use of uninterrupted scanning with a light beam whose velocity is controlled as a function of the intensity of the incident light on a sensing device, the present invention provides a number of advantages over the prior art including circuit simplification, greater speed of operation, improved dodging resolution by providing an infinite number of light spots in one direction of scanning, the elimination of start and stop marks on the resulting print, a most efficient use of the light available at the source, the elimination of color shifting of the light beam, avoidance of oscillation by the use of an open loop, and simplification of the exposure control function.

Among its objects, the present invention contemplates a method comprising directing a light beam on a subject to form a spot of light having a relatively small area as compared with the area of the subject, continuously scanning the subject with the spot, directing light produced by the beam from the subject towards a photosensitive surface and exposing the same, sensing the instantaneous values of intensity of a portion of the light directed towards the surface, and varying the velocity of the beam as a function of the instantaneous values of intensity. The light beam may be produced by a cathode ray tube and the velocity of the beam is capable of being varied as a direct function of the instantaneous values of intensity. The subject may be scanned in two directions, first in one direction and alternately, in the opposite direction. Each portion of the subject is preferably scanned an equal number of times equal to an integer which may be one. Exposure of the surface is preferably terminated when the subject has been scanned a whole number of times. The light beam may be maintained at substantially constant intensity and the size of the spot may be maintained constant. The scanning is preferably effected in two dimensions, the scanning in one of these dimensions being achieved by shifting the light beam or the photosensitive surface.

It is also among the objects of this invention to provide photographic dodging apparatus comprising a source of light producing a beam, means for deflecting the beam to scan a subject, means for supporting a subject to be scanned by the beam, means for supporting a photosensitive surface in a path of light directed from the beam and a subject, light intensity sensing means in a path of light directed from the beam and a subject, and circuit means interposed between the sensing means and deflecting means, the circuit means controlling the deflecting means as a function of instantaneous values of intensity sensed. The subject may be a transparency through which light from the source is transmitted to the surface. The circuit preferably includes means for adjusting the deflection limits of the beam in two dimensions together with means for blanking the light source responsive to the scanning of the subject a number of times equal to an integer. The circuit means also preferably includes means for varying the scanning velocity of the beam in one direction as a function of instantaneous values of intensity sensed by the sensing means and a staircase network controlling the deflecting means for the deflection of the beam in one direction.

Inasmuch as the method and apparatus contemplated herein can achieve automatic dodging by controlling deflection only of the light beam, the use of light sources other than cathode ray tubes becomes entirely feasible. However, variation in intensity and/or spot size can be effected additionally, where, for example, a change in color without a change of exposure is desired.

A more complete understanding of the invention will follow a description of the accompanying drawing where the single FIGURE is a block circuit diagram.

The light source has been depicted as a cathode ray tube 10, for purposes of example, having a cathode 12, control electrodes 14, a horizontal deflection yoke winding 16, a vertical deflection yoke winding 18, and a screen 20 from which light is directed through a lens 21 towards a subject 22, assuming the form of a transparency, to a photosensitive surface 24, which may be emulsion coated paper of the type conventionally used in photographic printing. The subject and photosensitive surface are suitably mounted in a support 25, or separate supports if desired. A portion of the light directed from the source and the subject will be sensed by a light sensing device in the form of a photomultiplier tube 26 having an anode 28, dynodes 30, and a cathode 32. The last dynode nearest the anode is employed as an anode and is connected by a lead 34 to a common terminal of leads 36 and 38 connected to a capacitor 40 and an operational amplifier 42 respectively. The opposite plate of the capacitor 40 is connected by a conductor 44 to a terminal 46 to which one side of the horizontal deflection yoke winding 16 is also connected. The output of the amplifier 42 is connected by means of a conductor 48 to the opposite side of the horizontal deflection yoke winding 16. The capacitor 40 and the operational amplifier 42 constitute a feedback integrator controlling the horizontal deflection yoke current and thereby controlling the velocity of the light beam during its horizontal scan. A resistor 50 having one end connected to the terminal 46 and its other end to ground, serves as a current sampling resistor from which a voltage feedback free of any inductive component produced by the yoke winding is applied to the integrating capacitor 40 and by a conductor 52 to a toggle 54 of a modified Schmidt type, whose output is connected by a conductor 56 to a terminal 58 connected by a lead 60 to the anode 28 of the photomultiplier tube and by a lead 62 to a staircase network 64. The horizontal limits of deflection of the light beam can be adjusted by manipulation of a left edge control knob 66 and a right edge control knob 68 associated with the toggle 54 which may operate resistors or potentiometers to set voltages at which the toggle will cause the direction of the light beam to be reversed.

Each reversal of the output of the toggle 54 produces a pulse to trigger the staircase network 64 having an output lead 70 connected with an operational amplifier 72 whose output lead 74 is connected with one side of the winding of the vertical deflection yoke 18, whose opposite end is connected by a conductor 76 to a terminal 78 having branched connections through a lead 80 to a current sampling resistor 82 whose other end is connected to ground and through a lead 84 to the staircase network 64. A conductor 86 is also connected to the terminal 78 and with the input of a toggle 88 of a modified Schmidt type, whose output lead 90 is connected to a terminal 92 from which a conductor 94 leads to the staircase network 64. A top edge control knob 96 and a bottom edge control knob 98 associated with the toggle 88 adjust reference voltages to determine the upper and lower borders of the raster produced by the cathode ray tube. The staircase network 64, the D.C. operational amplifier 72 and the toggle 88 constitute a staircase generator which may be of the share-of-charge type in which a small capacitor is charged during the horizontal sweep of the light beam, its charge being "dumped" into a larger feedback capacitor across the amplifier when the horizontal sweep reverses.

A run-stop flip-flop circuit 100 has an input lead 102 in circuit with a momentary contact switch 104 which is normally open. This flip-flop circuit interrupts the retrace between prints and also produces an unblanking operation of the cathode ray tube to initiate an exposure. The flip-flop circuit 100 has an output lead 106 connected to the staircase network 64 for the purpose of interrupting the retrace between prints, and an input lead 108 extending to a terminal 110 connected by a lead 112 to the terminal 92 and by a lead 114 to the input of an amplifier 116 whose output lead 118 is connected to the cathode 12 of the cathode ray tube 10. An exposure index control knob 120 associated with the staircase network 64 will adjust a variable capacitor, resistor or potentiometer to determine the step spacing and thereby the distance between horizontal scans or traces of the light beam.

Inasmuch as the horizontal scan or trace is effective alternately, in opposite directions, there is no inactive retrace of the type common in television practice, making possible a much more rapid operation and the elimination of relatively complex blanking circuits. Moreover, the light spot employed in accordance with the present invention has a discrete area which is greater than that of the finest detail of the transparency or other subject being scanned but very much smaller than the total area of the print to be produced. By virtue of the circuit provided, when an operation is initiated, the light spot will follow a horizontal path until it reaches the present limit, whereupon it will be moved vertically by a preset value of one line space and then moved in the opposite horizontal direction without further vertical movement until it reaches the other horizontal limit, whereupon it will be moved vertically again preparatory to a horizontal sweep in the direction originally assumed. When the subject has been scanned by the light beam a number of times corresponding to an integer, the light will be blanked and vertical retrace will occur preparatory to another scanning cycle.

Initiation of a scanning cycle is effected by momentary closure of the switch 104, the light blanking and retrace occurring automatically at the conclusion of such a cycle or whole number multiples thereof.

The arrangement of the transparency and photosensitive printing surface depicted in the drawing suggests a contact printer. However, the concept is equally applicable to the production of enlargements where the photosensitive printing surface will be spaced from the transparency and conventional optical components provided as desired. In the case of an opaque subject, light can be reflected therefrom to the photosensitive printing surface in accordance with the method and apparatus herein disclosed.

Since it is desirable that the scanned area be only slightly larger than the portion of the subject to be printed, the raster edge controls associated with the toggles 54 and 88 are particularly desirable. In the case of a contact printer of the type depicted in the drawing, the cathode ray tube 26 can receive light through the paper or other surface on which the photosensitive material 24 is coated. In other arrangements, the photomultiplier tube can receive its light by the use of beam splitters or other components known in the art.

Where the printing surface is intended to be moved, by proper synchronization of the movement with the horizontal scan of the system shown in the drawing, it may be possible to utilize only the horizontal scanning portion of the circuit, permitting the movement of the printing material to be substituted for the vertical stepping portions of the circuit. Whereas this invention has been described with reference to a single embodiment for purposes of example, as will be recognized by those skilled in the art, it will be more widely applicable to apparatus falling within the scope of the accompanying claims.

I claim:
1. Photographic dodging apparatus comprising a source of light producing a beam, means for deflecting said beam to scan a subject in two directions disposed at 180°, means for supporting a subject to be scanned by said beam, means for supporting a photosensitive surface in a path of light directed from said beam and subject, light intensity sensing means in a path of light directed from said beam and subject, and circuit means interposed between said sensing means and deflecting means, said circuit means including means velocity modulating said beam in both said directions continuously as a function of instantaneous values of intensity sensed.

2. Photographic dodging apparatus as set forth in claim 1 wherein said subject is a transparency through which light from said source is transmitted to said surface.

3. Photographic dodging apparatus as set forth in claim 1 wherein said circuit includes means for adjusting the deflection limits of said beam.

4. Photographic dodging apparatus as set forth in claim 1 wherein said circuit includes means for adjusting the deflection limits of said beam in two dimensions.

5. Photographic dodging apparatus as set forth in claim 1 wherein said circuit includes means for blanking said light source responsive to the scanning of said subject a number of times equal to an integer.

6. Photographic dodging apparatus as set forth in claim 1 wherein said source of light is a cathode ray tube.

7. Photographic dodging apparatus as set forth in claim 1 wherein said circuit means includes a staircase network controlling said deflecting means for the deflection of said beam in one direction.

References Cited in the file of this patent
UNITED STATES PATENTS

| | | |
|---|---|---|
| 2,039,406 | Greensfelder | May 5, 1936 |
| 2,301,374 | Cox | Nov. 10, 1942 |
| 2,757,571 | Loughren | Aug. 7, 1956 |
| 2,842,025 | Craig | July 8, 1958 |

OTHER REFERENCES

Television Engineering (Wilson), published by Sir Isaac Pitman & Sons, Ltd. (London), 1937. (Pages 48–9 relied upon.)